H. S. PARMELEE.
Fire Extinguisher.
No. 9,780. Reissued June 28, 1881.
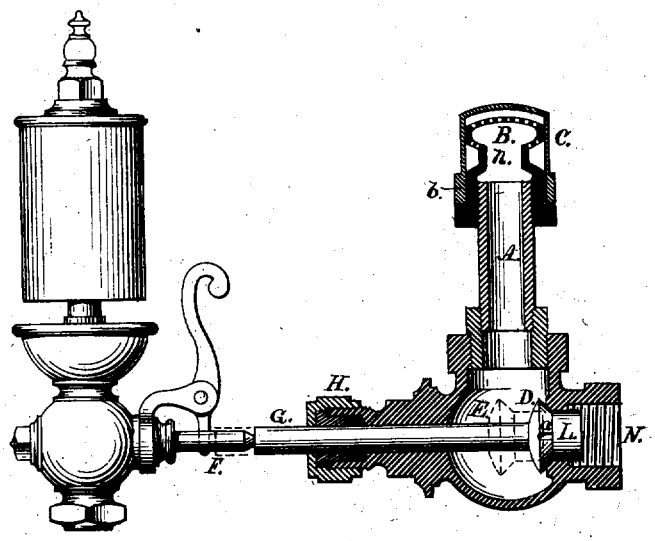
WITNESSES:
Wm. L. Cooper.
J. A. Miller Jr.
INVENTOR:
Henry S. Parmelee
by Joseph A. Miller Atty.

UNITED STATES PATENT OFFICE.

HENRY S. PARMELEE, OF NEW HAVEN, CONNECTICUT.

FIRE-EXTINGUISHER.

SPECIFICATION forming part of Reissued Letters Patent No. 9,780, dated June 28, 1881.

Original No. 156,374, dated October 7, 1874; Reissue No. 6,257, dated January 26, 1875; Reissue No. 8,376, dated August 13, 1878.
Application for reissue filed May 26, 1881.

*To all whom it may concern:*

Be it known that I, HENRY S. PARMELEE, of the city and county of New Haven, and State Connecticut, have invented a new and useful Improvement in Fire-Extinguishers; and I do hereby declare the following, when taken in connection with the accompanying drawing and the letters of reference marked thereon, to be a full, clear, and exact description of the same, and which said drawing constitutes part of this specification, and represents a sectional side view.

This invention consists in the combination, with a distributer of water under pressure (or other fire-extinguishing agent) and a hard-metal cap, which is able to confine the extinguishing agent and is secured to the distributer by solder fusible at a low temperature, which, when melted by the effect of a fire in the room where the extinguisher is placed, will release the cap, and the extinguishing agent will be permitted to discharge through the distributer.

It further consists in constructing the distributer with a recess or neck between it and its base, and with the distributer perforated, so as to scatter the water in a spray over a large area in directions upward, downward, and lateral; and it further consists in constructing the valve which actuates the alarm with a cylindrical projection below the seat, which nearly fills the opening through the seat, and so as not to allow a full flow of water until the cylindrical projection has passed above the valve-seat, whereby an increased movement is given to the valve to act upon the alarm, as more fully hereinafter described.

In the drawing, A is the pipe or tube forming one of the branches extending from the water-supply main, to which the perforated distributer is attached. Over the distributer the cap C (usually made of brass) is loosely fitted, and is secured thereon by a metal or material fusible at a low degree—say one 120°—but so as to make a tight joint and prevent the escape of water, gas, or whatever may be contained in the pipe. To allow the water to be distributed in all directions in a fine spray I contract the distributer so as to form the neck *n* between the distributer and the base *b*, where the cap is secured, and I place a number of holes on the lower side of the head, as well as on the upper curved surface.

On examining the drawing it will be observed that the cap C nearly fits the base *b* of the distributer, and that a broad surface is presented, on which the fusible material is placed to solder the cap to the distributer; hence the water can only reach the thin upper edge of the fusible material with which the soldered joint is made until the cap is released and has passed beyond or entirely from the distributer. Therefore the quantity of water which can reach the fusible material is so small as not to materially affect its fusibility. So soon as this cap shall have become heated to the previously-determined degree the material which secures it in place will fuse, thus freeing the cap from its connection, and the pressure within the pipes will force the cap off the distributer and thereby allow the water to flow freely through the said distributer. This completes the first part of my invention.

D is the valve arranged within the chamber E to fit upon the seat F, in substantially the usual manner, with the spindle G running out through the stuffing-box; also, in the usual manner, upon the under side of the valve is a cylindrical projection, L, which nearly fills the opening through the valve-seat.

N is the inlet through which the water or whatever it may be is to flow to the distributer; and in order to hold the valve at rest upon its seat—that is, to balance the valve—a slight opening, *a*, is made through the valve, which will allow the water to flow through and fill the chamber E on the back side of the valve; hence so long as the distributer is closed the valve must also remain closed, but so soon as the cap is thrown off the pressure upon the back of the valve will be removed and the valve will open to allow the free flow of the water.

To sound the alarm (here represented as a steam-whistle actuated through the valve-stem P) a considerable motion of the valve-spindle G is necessary, more than would naturally be given by the opening of the valve. By the addition of the cylinder L of the valve the passage cannot be fully open until this part L of the valve has passed back or above the seat; hence there must be given to the valve an additional movement, according to the length of the part L, and this is sufficient to give the required movement to the alarm. This completes the second part of my invention, and this is applicable to other purposes than for a fire-extinguisher, where it is desirable to sound an alarm.

I do not broadly claim a cap secured over the distributer, to be loosened or removed by heat, as such, I am aware, is not new, as shown and described in Patent No. 141,062, to H. S. Maxim, July 22, 1873; Patent No. 117,900, to Samuel M. Lillie, August 8, 1871; and my own patent, granted August 11, 1874, and numbered 154,076.

My improved device is complete in itself, consisting in a distributer and a cap made of hard metal, the two secured together by a film of fusible solder. When a fire breaks out the heat does not destroy any portion of the device, it only melts the solder; and if the cap is placed again over the distributer and heated to the proper degree the cap will resolder and the extinguisher will again be ready for use and able to confine water under pressure or other fire-extinguishing agents.

Having thus described my invention, I claim as new and desire to secure by Letters Patent—

1. An automatic fire-extinguisher consisting of a distributer and a hard-metal cap placed over the distributer and secured by a metal fusible at a low temperature.

2. The combination, with a perforated distributer, of a hard-metal cap secured to the distributer below the perforations by a metal fusible at a low temperature, so as to make a water-tight joint, as described.

3. The combination, with a distributer provided with a base, of a hard-metal cap constructed to fit the base and secured thereto by a metal fusible at a low temperature, as described.

4. In an automatic fire-extinguishing apparatus, the combination, with the supply-pipe, of hard-metal caps closing the outlets of such pipe, secured by a metal fusible at a low temperature, as described.

5. In combination with the distributer B, provided with a contracted neck and extended base *b*, the cap *c*, secured to the said base by a fusible material, substantially as and for the purpose set forth.

6. In combination with an alarm, an elongated valve, L, extending through the valve-opening, whereby the passage closed by said valve is not opened until the valve shall have been moved its length and the alarm sounded.

7. The combination, with the valve D, provided with the opening *a*, of a cylindrical extension nearly filling the valve-opening, arranged to move through a fixed distance before the free discharge is opened, substantially as and for the purpose set forth.

HENRY S. PARMELEE.

Witnesses:
JAMES GARNER CLARK,
J. A. MILLER, Jr.